United States Patent
Zimmer

[11] Patent Number: 6,115,876
[45] Date of Patent: Sep. 12, 2000

[54] WIPER SYSTEM

[75] Inventor: Joachim Zimmer, Sasbach, Germany

[73] Assignee: Robert Bosch GmbH, Stuttgart, Germany

[21] Appl. No.: 09/319,829
[22] PCT Filed: Oct. 8, 1998
[86] PCT No.: PCT/DE98/02967
   § 371 Date: Aug. 9, 1999
   § 102(e) Date: Aug. 9, 1999
[87] PCT Pub. No.: WO99/19178
   PCT Pub. Date: Apr. 22, 1999

[30] Foreign Application Priority Data

Oct. 11, 1997 [DE] Germany ............ 197 45 006

[51] Int. Cl.[7] ............................................. B60S 1/38
[52] U.S. Cl. ............................................. 15/250.48
[58] Field of Search ............... 15/250.48, 250.451, 15/250.452, 245, 250.453, 250.33

[56] References Cited

U.S. PATENT DOCUMENTS

| 2,632,907 | 3/1953 | Anderson | 15/250.33 |
| 2,792,585 | 5/1957 | Scinta | 15/250.48 |
| 3,048,872 | 8/1962 | Kerrigan | 15/250.48 |
| 5,462,707 | 10/1995 | Nagy | 15/250.451 |

FOREIGN PATENT DOCUMENTS

| 0 012 251 | 6/1980 | European Pat. Off. . |
| 975 208 | 11/1961 | Germany . |
| 707559 | 4/1954 | United Kingdom . |
| 710360 | 6/1954 | United Kingdom . |
| 1 373 474 | 11/1974 | United Kingdom . |

*Primary Examiner*—Gary K. Graham
*Attorney, Agent, or Firm*—Michael J. Striker

[57] ABSTRACT

The invention is directed to a wiper installation, especially for windows of motor vehicles, with at least one wiper rubber which is held in contact with the substrate to be wiped by a clip, wherein the clip is connected with a drivable wiper arm, and a holding area between the wiper rubber and clip is formed as a hinge, wherein a hinge axis extends in the longitudinal direction of the wiper rubber. It is provided that at least one damping element (42) for damping a rotating movement of the wiper rubber (14) is associated with the hinge (40).

6 Claims, 3 Drawing Sheets

WIPER SYSTEM

BACKGROUND OF THE INVENTION

The invention is directed to a wiper installation, especially for windows of motor vehicles.

Wiper installations of the type mentioned above are known. As a rule, they have at least one wiper rubber which maintains contact with a window to be wiped and is movable back and forth between two reversal positions. For this purpose, the wiper rubber is fastened to a bracket or clip which is connected with a drivable wiper arm. The clip has at least one claw, generally a plurality of claws which are arranged at a distance from one another along the longitudinal extension of the wiper rubber whose head is held by the claws. The head of the wiper rubber has corresponding recesses in which the clip can engage.

It is known from DE 975 208 to dimension the head of the wiper rubber so that, considered in cross section, it is smaller than a space enclosed by the clip. In this way, an articulation or hinge is formed between the clip and the wiper rubber, wherein a hinge axis runs along the longitudinal extension of the wiper rubber. This arrangement makes it possible to deflect the wiper rubber during its movement across the window due to a frictional force acting at the wiper rubber, resulting in a tilted position between the wiper rubber, in particular a lip contacting the surface of the window, and the window. This results in a more uniform wiping pattern. In particular, noise generated by the wiper rubber guided across the window is prevented in this way. Corresponding to the back-and-forth movement between the two reversal points of the wiper rubber, a corresponding deflection of the wiper rubber is carried out in the other respective direction opposite to the wiping direction. The degree of deflection of the wiper rubber is determined by the play of the wiper blade head inside the space enclosed by the clip. A disadvantage in the known arrangement consists in that noise develops as a result of the head knocking against the clip when the wiper rubber flips over, which happens impulsively due to a sudden change in the wiping direction in exactly the opposite direction.

SUMMARY OF THE INVENTION

The wiper installation according to the invention offers the advantage over the prior art that a development of noise of the type mentioned above is prevented. Owing to the fact that at least one damping element for damping the rotating movement of the wiper rubber is associated with a hinge formed between the wiper rubber and the clip, it is advantageously possible to dampen the impulsive flipping over of the wiper rubber at least in the area of the head enclosed by the clip, so that the tilting movement is braked in this area against the force of the damping element. In particular, when the entire wiper rubber is formed of elastic material, the lip area contacting the window to be wiped can be flipped over impulsively without this rotational movement being transmitted directly to the head of the wiper rubber. Due to the arrangement of the damping element, a tilting movement of the head is carried out after a delay and with a decelerated impulsive force, so that the head is prevented from knocking against the clip enclosing it and the noise generated in this way is accordingly prevented.

In a preferred construction of the invention, it is provided that the damping element is constructed in one piece with the wiper rubber, especially with the head of the wiper rubber. In this way, it is easily possible to construct the wiper rubbers with an integral damping element by means of known methods, for example, extrusion of elastic materials. This also reduces expenditure on the construction of damping elements to a negligible amount.

In a further preferred construction of the invention, it is provided that at least one damping element maintains constant contact with the clip enclosing the head of the wiper rubber. In this way, it is ensured that a damping of the tilting movement of the wiper rubber, especially in the area of its head, is initiated immediately as soon as the wiper rubber flips over in the reversal positions.

Further advantageous constructions of the invention follow from the rest of the features indicated in the subclaims.

DESCRIPTION OF THE PREFERRED EMBODIMENT EXAMPLES

Figure 1:
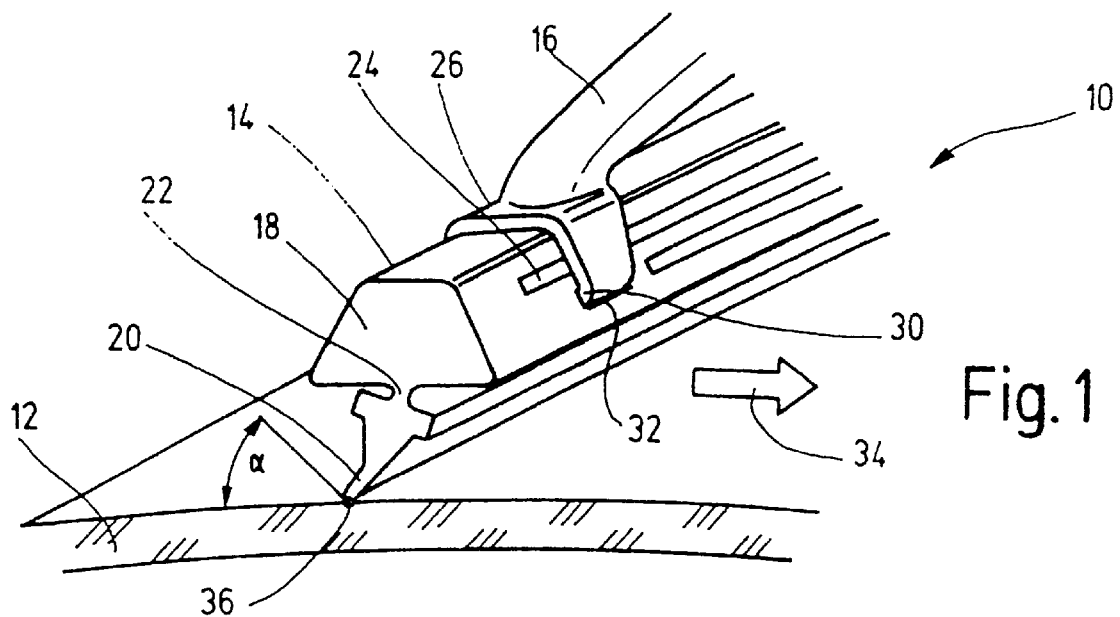
FIG. 1 shows a schematic perspective view of a part of a wiper installation for motor vehicles.

FIG. 1 shows a sectional perspective view of a window wiper installation 10 for a window 12 of a motor vehicle. Only an area of the window wiper installation 10 showing the fastening of a wiper rubber 14 to a clip 16 is shown. The clip 16 is fastened in turn to a wiper arm which can be driven by driving means, so that the wiper rubber 14 executes a back-and-forth movement between two reversal points on the window 12 in a known manner.

The wiper rubber 14 has a head 18 and a lip 20 which are connected with one another by a bending web 22. The wiper rubber 14 is made of an elastic material, for example, rubber. At least one spring strip 24 is arranged in the longitudinal extension of the wiper rubber 14 and serves to stabilize the wiper rubber 14. As is shown in FIG. 1, the spring strip 24 can be formed as an outer spring strip or, as the following Figures show, as an internal spring strip 24. The clip 16 has claws 26 which are formed from a substantially rectangular or trapezoidal section having a slit-shaped opening 28 (not visible in FIG. 1) on its side remote of the clip 16. Gripping portions 30 engaging in groove-like recesses 32 of the wiper rubber 14 are formed in this way.

During proper use of the window wiper installation 10, the wiper rubber 14 is guided across the window 12 by means of the clip 16. There results an instantaneous movement direction 34 of the wiper rubber 14. The movement direction 34 has opposed direction vectors corresponding to the wiping movement of the wiper rubber 14. Due to its construction, the wiper rubber 14 folds over opposite to its movement direction 34. Accordingly, there occurs a blade angle α between a contact face 36 and the window 12. Angle α is 45°, for example. In this way, the wiper rubber 14 is drawn over the window 12, so that a flawless wiping pattern results on the one hand and a noiseless movement of the wiper rubber 14 is made possible on the other hand.

The view in FIG. 1 serves only to illustrate the function of the wiper rubber 14. The construction of the wiper rubber 14 according to the invention is explained more fully with reference to the following FIGS. 2 to 5. FIGS. 2 to 5 show schematic sectional views of the window wiper installation 10 in the area of a claw 26 of the clip 16. In this connection, identical parts are provided with the same reference numbers and are not explained further.

Figure 2:
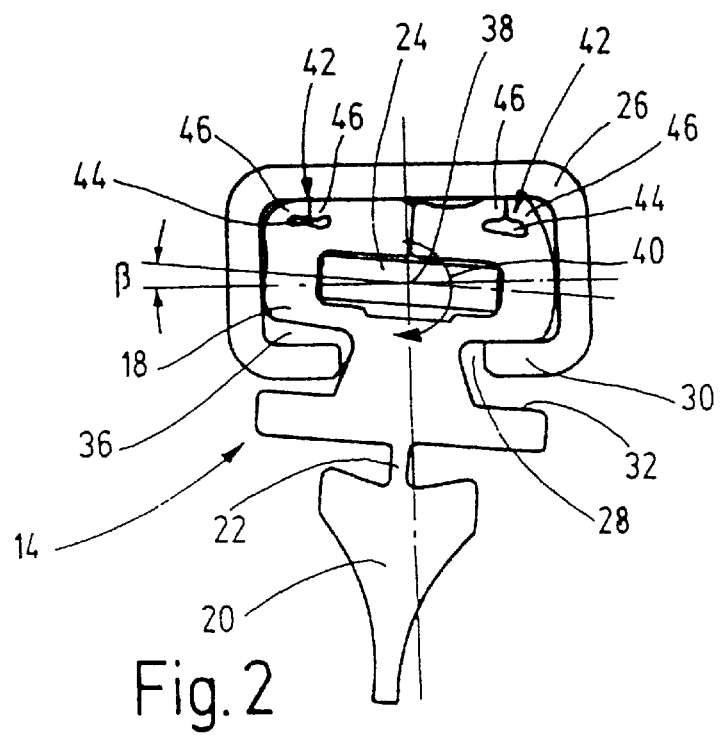
FIGS. 2 and 3 show a construction, according to the invention, of a wiper blade in a first embodiment example.
Figure 3:
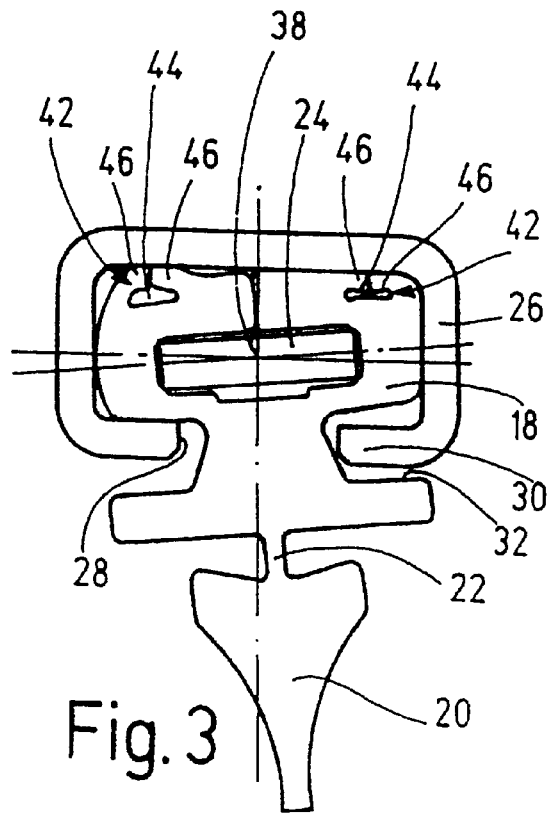

As is shown in section in FIGS. 2 and 3, the head 18 of the wiper rubber 14—considered in cross section—is dimensioned so as to be smaller than a space 36 surrounded by the claw 26. In this way, a free space is formed between the claw 26 and the head 18. Corresponding to the size of the free space, the head 18 is supported so as to be rotatable about its longitudinal axis 38, so that a hinge 40 is formed between the head 18 and the claw 26. A maximum angle of rotation β of the hinge 40 is determined by the size of the free space between the head 18 and the claw 26 and by an elasticity of the material of the wiper rubber 14, especially of its head 18.

The head 18 forms damping elements 42. These damping elements 42 are formed by tabs 46 enclosing a hollow space 44 of the head 18. In the embodiment example shown in FIGS. 2 and 3, two tabs 46 are provided, formed in one piece with the head 18, and enclose the hollow space 44. The damping means 42 are formed in the corner areas of the head 18, that is, in an area which must travel the greatest distance as a result of the rotation about the longitudinal axis 38. The tabs 46 are pretensioned in such a way that contact is maintained with the claw 26 in every position of the head 38. FIG. 2 and FIG. 3 show the two possible maximum positions of the wiper rubber 14 and, therefore, of its head 18. Depending on the movement direction 34, the wiper rubber 14 is flipped or turned over in one direction or the other opposite to the movement direction 34 as was described with reference to FIG. 1. In the reversal positions of the wiper rubber 14, the lip 20 is flipped over suddenly, i.e., impulsively, by the change in the movement direction 34. Owing to the connection with the head 18 by the bending web 22, this movement is transmitted to the head 18, so that the head 18 is rotated about the longitudinal axis 38. Due to the fact that the tabs 46 rest against the claw 26, these tabs 46 exert a springing force on the head 18 which is opposed to the rotating movement of the head 18 by angle β. In this way, this rotating movement of the head 18 is damped, so that a sudden rotation of the head 18 is prevented. Owing to the fact that the tabs 46 rest against the claw 26 at all times, the wiper rubber 14 is guided in the clip 16, particularly in its claws 26, so as to be free from play. Depending on the direction in which the wiper rubber 14 flips over, the damping is carried out by the damping element 42 shown on the left-hand side or by the damping element 42 on the right-hand side.

Figure 4:
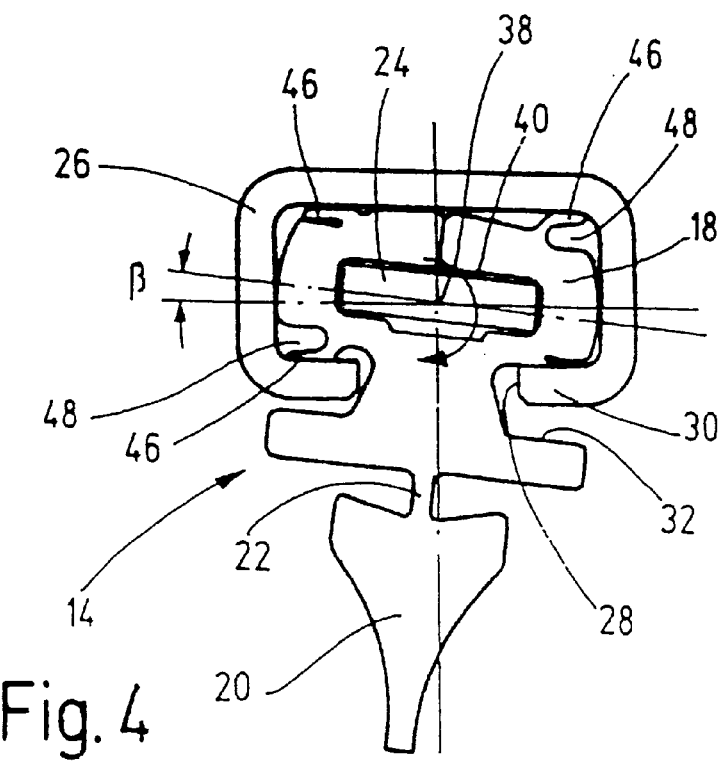
FIGS. 4 and 5 show a construction, according to the invention, of a wiper blade in a second embodiment example.
Figure 5:
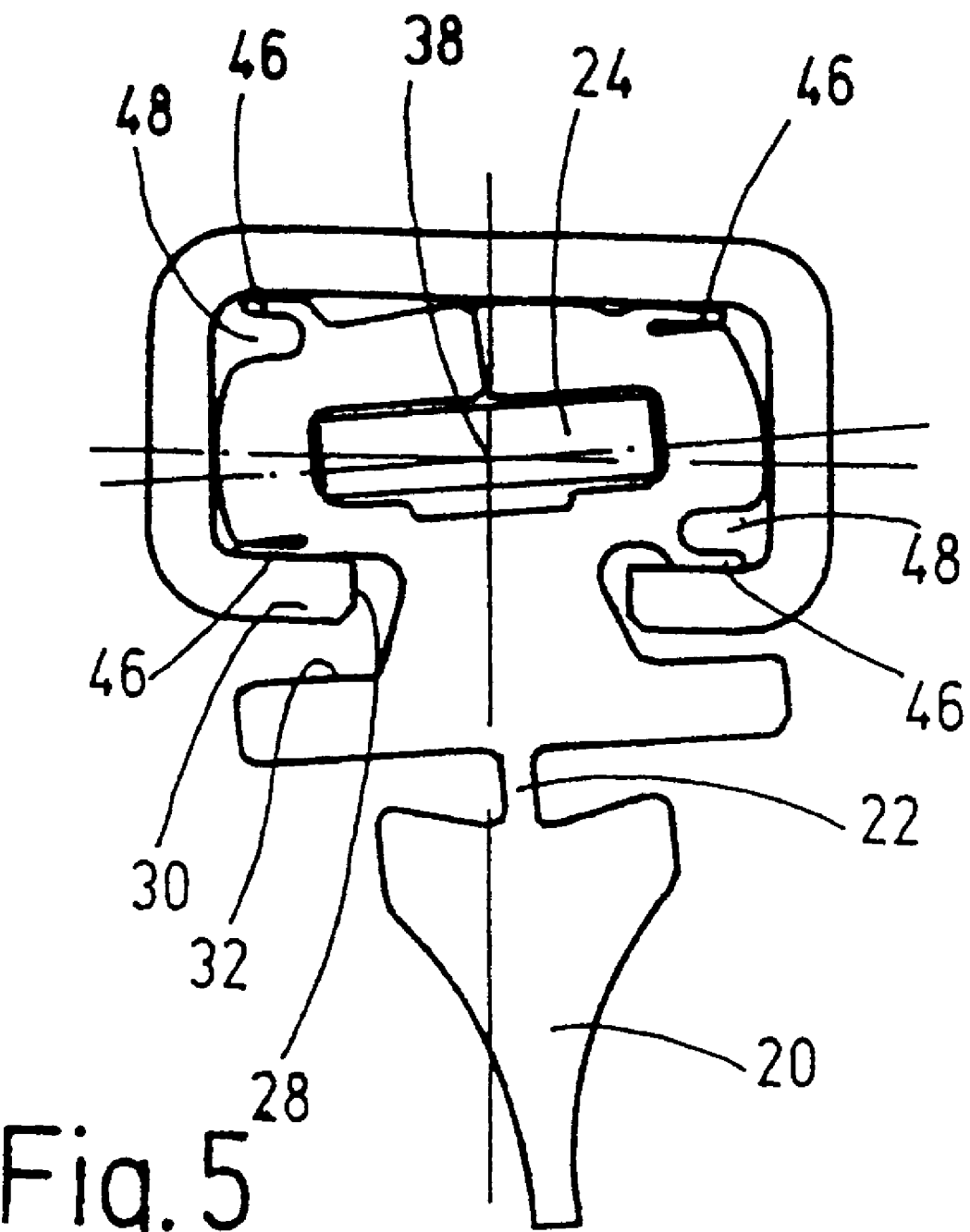

FIGS. 4 and 5 show another embodiment example, wherein identical parts are provided with the same reference numbers and are not further described. In this case, the damping elements 42 are also formed by four tabs 46, wherein these tabs 46 are arranged as individual tabs in the corner areas, viewing the head 18 in cross section. The hollow space between the head 18 and the tabs 46 is formed as a recess 48 with open edges. The tabs 46 are pretensioned in such a way that they contact the claw 26 at all times, so that the wiper rubber 14 is guided without play. Depending on the flipping over of the wiper rubber 14, tabs 46 arranged diagonally opposite one another are compressed, so that the rotating movement of the head 18 must be carried out against a springing force proceeding from the tabs 46, in this case, the diagonally opposite tabs 46. This causes a damping of the rotating movement at angle β.

With reference to the embodiment examples shown in the drawings, it will be readily appreciated that a guiding of the claws 26 without play is ensured on the one hand and a damping of a sudden rotating movement of the head 18 of the wiper rubber 14 caused by flipping over is carried out on the other hand by means of simple measures, namely, the tabs 46 which are preferably formed jointly with the wiper rubber 14. The degree of damping can be adjusted as a function of the shape and/or size of the tabs 46.

Of course, the invention is not limited to the embodiment examples shown herein. The arrangement of other damping means is also possible. For example, the damping means can be arranged at the claws 26 which, in this case, cooperate with the head 18.

What is claimed is:

1. A wiper installation for windows of motor vehicles, said installation comprising: at least one elongated wiper rubber (14) having a head (18) with a top and a bottom, said head having a plurality of corner areas, a lip (20) extends from said bottom of said head, said lip is adapted to be held in contact with a substrate to be wiped, a clip connected with a drivable wiper-arm, the clip defining a holding area therein for encircling and supporting the head in a hinged manner, wherein a hinge axis extends through the head in a longitudinal direction of the wiper rubber, characterized in that at least two damping elements (42) for damping a rotating movement of the wiper rubber (14) about said axis extend from said head, wherein each damping element (42) is formed by two tabs (46) enclosing a hollow space (44) in opposing corner areas of the head (18), said damping elements lie on opposite sides of a plane which contain said hinge axis and are pretensioned against said claw such that they contacts the claw at all times.

2. Wiper installation according to claim 1, characterized in that the damping elements (42) are connected with the head in a springing manner.

3. Wiper installation according to claim 1, characterized in that the damping elements (42) extend from the top of the head.

4. A wiper installation for windows of motor vehicles, said installation comprising: at least one elongated wiper rubber (14) having a head (18) with a top and a bottom, said head having two corner areas on said top and two corner areas on said bottom, a lip (20) extends from said bottom of said head, said lip is adapted to be held in contact with a substrate to be wiped, a clip connected with a drivable wiper-arm, the clip defining a holding area therein for encircling and supporting the head in a hinged manner, wherein a hinge axis extends through the head in a longitudinal direction of the wiper rubber, characterized in that four damping elements (42) for damping a rotating movement of the wiper rubber (14) about said axis extend from said head, each damping element is formed by a bent tab extending from one of said corner areas of said head and defining with respect to the head a recess, each damping element being pretensioned against said claw such that it contacts the claw at all times.

5. Wiper installation according to claims 4, characterized in that the recesses are open edged recesses.

6. Wiper installation according to claim 1, characterized in that the damping elements are formed in one piece with the head (18) of the wiper rubber (14).

* * * * *